United States Patent [19]
Mägerle

[11] 4,200,482
[45] Apr. 29, 1980

[54] PROCESS AND APPARATUS FOR THE PRODUCTION OF A PIPE-SHAPED HOLLOW BODY, ESPECIALLY OF CONTAINER TUBES FROM A MULTILAYER COMPOSITE SHEET MATERIAL

[76] Inventor: Karl Mägerle, Im vorderen Erb 1, 8700 Kusnacht, Switzerland

[21] Appl. No.: 838,966

[22] Filed: Oct. 3, 1977

[30] Foreign Application Priority Data

Oct. 6, 1976 [CH] Switzerland .................. 12614/76

[51] Int. Cl.² .............................................. B29D 23/10
[52] U.S. Cl. .................................... 156/443; 156/510; 156/538; 156/218
[58] Field of Search ............... 156/218, 443, 469, 510, 156/538, 217, 203

[56] References Cited

U.S. PATENT DOCUMENTS 2,403,995 7/1946 Peters .................................. 156/466
3,597,292 9/1971 Takeda ................................ 156/218
3,764,425 10/1973 Neff et al. ........................... 156/443
3,912,568 10/1975 Ueno et al. ......................... 156/218

FOREIGN PATENT DOCUMENTS 1429701 3/1976 United Kingdom .

OTHER PUBLICATIONS

JA. L. Watkin et al., "Pipe Manufacture", *Metallurgy*, 1970 Edition (in Russian), p. 412.

*Primary Examiner*—John T. Goolkasian
*Assistant Examiner*—William H. Thrower
*Attorney, Agent, or Firm*—Cushman, Darby & Cushman

[57] ABSTRACT

For producing a tubular body from a blank of sheet material of which the opposite faces, at least adjacent respective opposite lateral margins of each face are made of mutually weldable thermoplastic material, the blank having a central section, and two opposite flanks which respectively have said opposite lateral margins distally of the central section.

9 Claims, 7 Drawing Figures

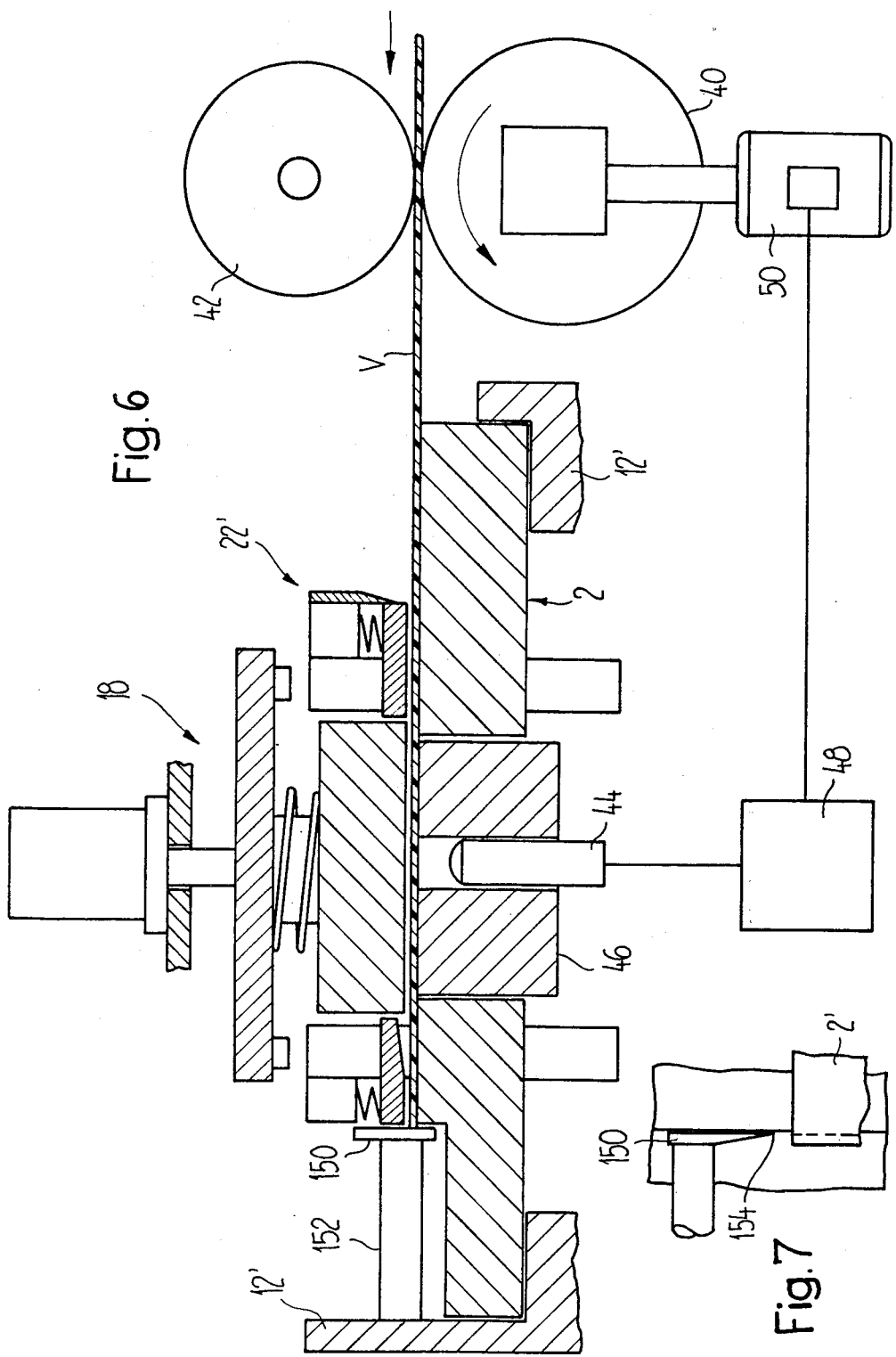

PROCESS AND APPARATUS FOR THE PRODUCTION OF A PIPE-SHAPED HOLLOW BODY, ESPECIALLY OF CONTAINER TUBES FROM A MULTILAYER COMPOSITE SHEET MATERIAL

FIELD OF THE INVENTION

The present invention relates to a process for the production of a pipe-shaped hollow body especially for packing tubes of multilayered composite material, the edges of which, made to overlap, are welded together by way of thermoplastic outside layers of the composite material.

BACKGROUND OF THE INVENTION

In case of a process of this type, known already, the blank of composite material is shaped into a pipe in one winding process, which makes use of a driveable mandrel, mounted rotatably.

In another known process for the production of pieces of pipe, a moving, endless web of composite material that is continuously arched in its longitudinal axis, is formed into a pipe and this is closed in cross section by continuous welding of the longitudinal edges of the web, made to overlap. Hollow bodies are then cut off from the developing endless pipe.

The arrangements serving for carrying out the previously mentioned known processes are relatively expensive.

Composite material, blanks and tube, particularly those made of plastic material with an incorporated metal layer are shown in my copending U.S. patent application Ser. No. 698,783, filed June 22, 1976.

SUMMARY OF THE INVENTION

The present invention has therefore for its purpose, the provision of a process which permits simplifications in the production steps or in the apparatus for carrying out said process.

The process of the invention is distinguished by the fact that the blanks, starting out from a middle range fixed in its entire extent, are shaped by bending back the areas succeeding at both sides.

Apparatus for carrying out the process and likewise according to the invention, include a mandrel, an arrangement for feeding a blank to the mandrel, means to wind the blank around the mandrel, as well as welding means in order to weld the edges of the blank overlapping, on the mandrel with one another, and is distinguished by the fact that transversely moveable forming jaws are assigned to the non-rotatable mandrel and in that the feed-in arrangement has a receiving table shiftable in the longitudinal axis of the mandrel, which is moveable between a position assigned to the mandrel and one loading position.

The process of the invention has the essential advantage that hollow bodies may be produced with an extremely small diameter tolerance, which is of importance particularly in connection with further processing into packing tubes.

The process of the invention finally permits one to operate with an apparatus which requires no rotatable parts for the shaping of the tube-pipes. Correspondingly, one may not only operate with a stationary mandrel, on which the blank remains until the welding of the overlapping has also been accomplished, but one might also do without rotatable casings or rollers.

Of even greater importance, as a result of the process and despite narrow overlapping of the edges of the blank, a reliable welding seam may be produced. This characteristic is to be traced back to the precision of the diameter resulting from the process, when shaping the pipe from the blank, and thus the continuously equal width of this overlapping and the continuously equal position of it in relation to the mandrel and the welding tool.

According to a preferred embodiment, the blanks are formed from a web of composite material, the width of which is equal to the length, or to a multiple of the length of the tube-pipe to be produced, made always by two cuts running transversely to the longitudinal direction. The two cuts, one of which may be designated as a separating cut and the other as a "cutting-to-length" cut, are made simultaneously, or else the separating cut is made first and then the "cutting-to-length" cut. The separating cut at the same time is made in every case in the connected web of material and to be sure at a distance from the free or leading end of it, which is greater by the width of a "cutting-to-length" strip then the unwinding length of the blank. By "unwinding length of the blank" is meant in the present instance, the measure, which results from the sum of periphery of the tube-pipe to be produced and the width of the overlapping. The "cutting-to-length" cut on the other hand takes place by the width of the "cutting-to-length" strip from the free end of the web of material, or else whenever the separating cut had already been made previously, removed from the corresponding end of a raw blank formed by the former.

In this case it is essential that both cuts take place at a time, when the part-piece of the web of material, forming the corresponding blank, is already aligned with regard to the axis of the mandrel, or else when it is clamped down on a part of the apparatus, which during the feeding-in of the finished blank to the mandrel, follows a predetermined path.

As a result of this measure, which compensates for inaccuracies of the advance (feed) of the web of material, especially with regard to the linear measure of the feed-steps, one will not only achieve, a finished blank with the predetermined measure in the peripheral direction of the tube that is to be produced (and thus precision in the predetermined width of the overlapping), but also that the overlapping of all blanks fed to the mandrel will assume a predetermined peripheral position aligned with the welding tool.

This measure has another significance and advantageous effect in case of such composite material webs, which already bear the printed picture of the finished tube (corresponding to the filler material) which represents the rule in case of an expedient imprint.

Advantageously the printed picture is scanned by a photocell at a predetermined place, in order to interrupt the feed of the web of material. Since the printed picture, in case of completion of the composite material will experience deformation to a slight extent (because the composite material which bears this printed picture, will be longer or shorter) the leading edge of the advanced web of material does not always stop at the same place. Whenever the feed is controlled, such that the raw blank is given an excess measure in relation to the blank, then in case of dimensioning of this excess measure, and corresponding to the occurring errors (printed picture, feed), by the "cutting-to-length" of the blank as well as its precise alignment with the axis of the mandrel properly finished blanks may be achieved nevertheless.

The "cutting-to-length" of the raw blank is accomplished according to an advantageous development of the apparatus by a second knife, which, as compared to a first knife, separating the raw blank from the web, is adjusted to a distance corresponding to the measurement of the blank.

Although by "cutting-to-length" of the raw blank to the measure of the cut, some material in the form of a narrow strip is lost (even if the errors add up, this will not come to more, even in case of larger tube diameters, than a few millimeters), hardly any more material, and in some cases even less material is required altogether for the production of tubes according to the invention, than whenever such tubes are produced according to a known process of the first-mentioned prior art type. The strip lost by "cutting-to-length" is in most cases made up by the decrease of the width of the overlapping of the edges of the cut (blank). The advantages of a narrow and nevertheless reliable overlapping as well as of a seam which contains no chips are thus achieved without any increased consumption of material.

Preferably the cut for "cutting-to-length" is carried out by means of a "cutting-to-length" knife, past which the blank is conducted on its way from the loading station to the shaping station by means of a carriage. Correspondingly the knife is disposed such that its cutting edge runs at an angle in relation to the plane of the receiving table, on which the blank is clamped. At the same time it is important, that in the shaping process of the hollow body, that edge of the blank which was produced by the "cutting-to-length" knife comes to rest on the inside of the hollow body. This measure is of importance, because a "cutting-to-length" knife operating in this way will avoid the formation of fibers or chips, which adhere to the cut edge and are not covered up during the welding together. Whenever in case of the composite material we are dealing with a kind which, for example, contains an aluminum layer, then aluminum chips may develop during production of the blank, which adhere to the cut edge or in the plastic layers adjacent to the metal layer. Since such chips may still be present even after the welding together of the overlappings, without the plastic having flown over it, no lining, inert with respect to the filler material, of the body of the tube can be guaranteed. In any case such a packing tube is not acceptable according to the quality standards of producers of sensitive filler materials.

Examinations of tubes, in case of which the "cutting-to-length" cut for forming the inside edge of the overlapping was made by means of a knife of the previously mentioned type, have shown, that cut edges completely free of chips will develop.

The apparatus of the invention will be described subsequently on the basis of two embodiments in connection with the drawings, whereby one embodiment of the process of the invention is also explained.

BRIEF DESCRIPTION OF THE DRAWING

In the Drawing:
FIG. 6 shows a cut corresponding to FIG. 3 through a second embodiment of the apparatus;
and
FIG. 7 shows a detail of FIG. 6 in top view.

DETAILED DESCRIPTION

Figure 1:
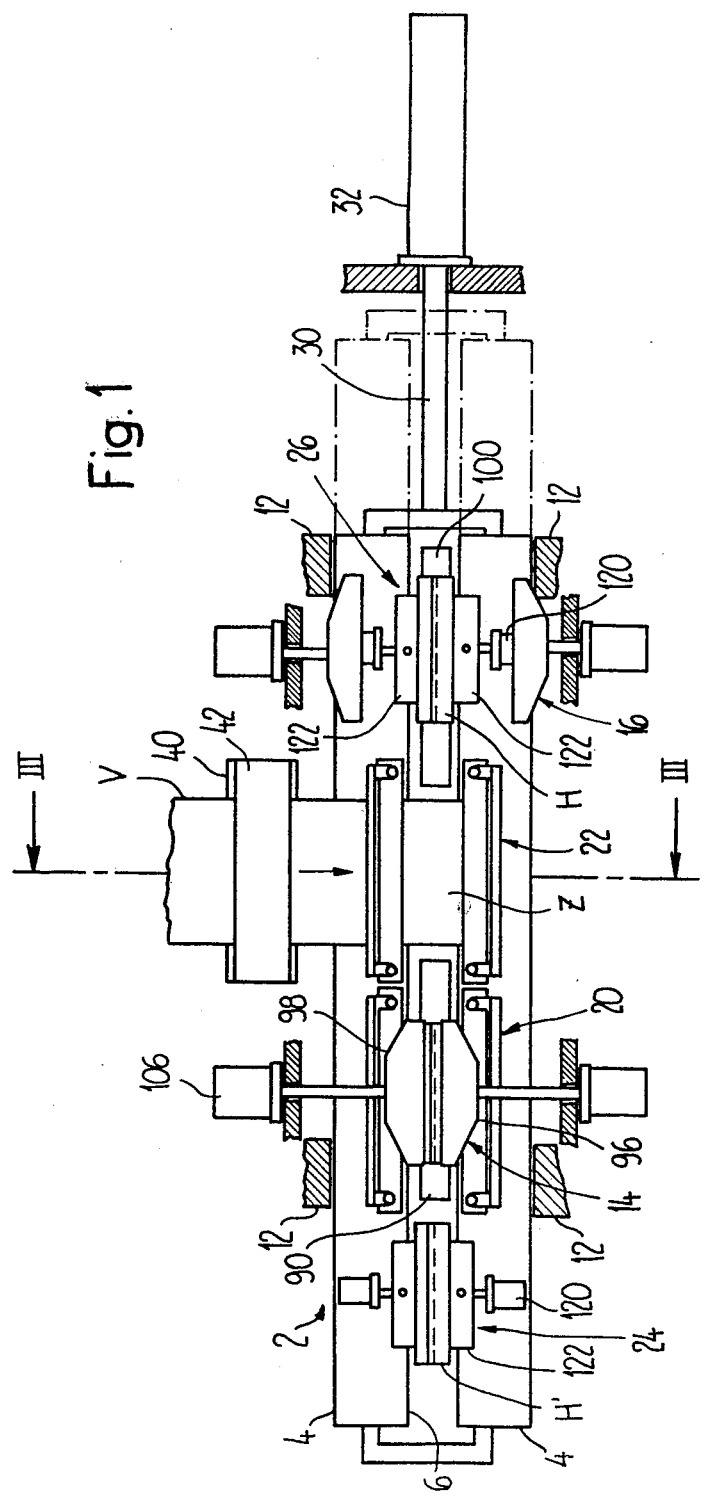
FIG. 1 shows the first embodiment of the apparatus according to the invention in ground plan.

In the drawings, an apparatus is shown for the production of the pipe bodies of packing tubes. In that case, as becomes clear from FIGS. 1 and 2, there is a carriage 2 movable horizontally in a machine frame 12. Two forming stations 14 and 16 as well as a loading station 18 (FIG. 2), distributed in the longitudinal direction of the carriage, are fixedly assigned to said carriage 2. Beside that, the carriage 2 in its middle part forms two adjacent receiving tables 20 and 22, and at its ends it bears unloading tools 24 and 26. The carriage 2 is in driving connection via a linkage 30 with a pressurized fluid-powered cylinder 32, where it is moved alternatingly from the end-position, shown in a solid line in FIG. 1, into the end position shown in a dash-dot line and back again into the first end position. The carriage 2, as is shown clearly in FIG. 1, has two halves 4, which between them form space 6, extending in a longitudinal direction and which are rigidly interconnected at both ends by stirrups 8. In the space 6, are elements of the stationary stations of the apparatus, namely of the loading station 18 and the forming stations 14 and 16, which will be explained subsequently in more detail in connection with their method of operation.

Figure 2:
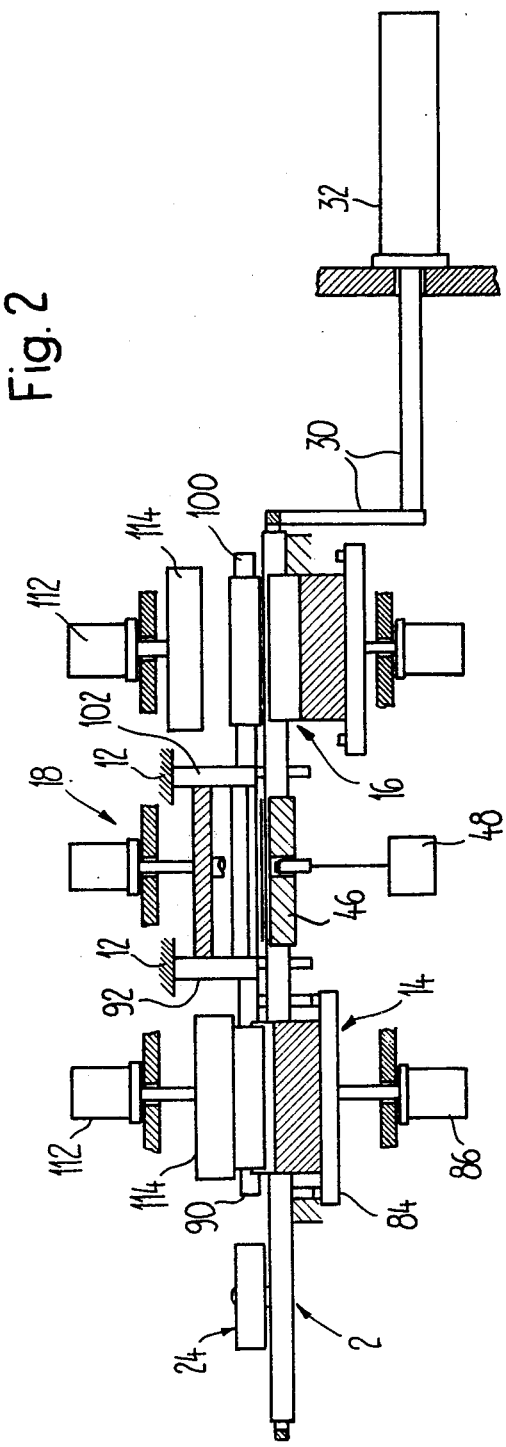
FIG. 2 shows a side view of the apparatus as in FIG. 1, partly in cut.
Figure 3:
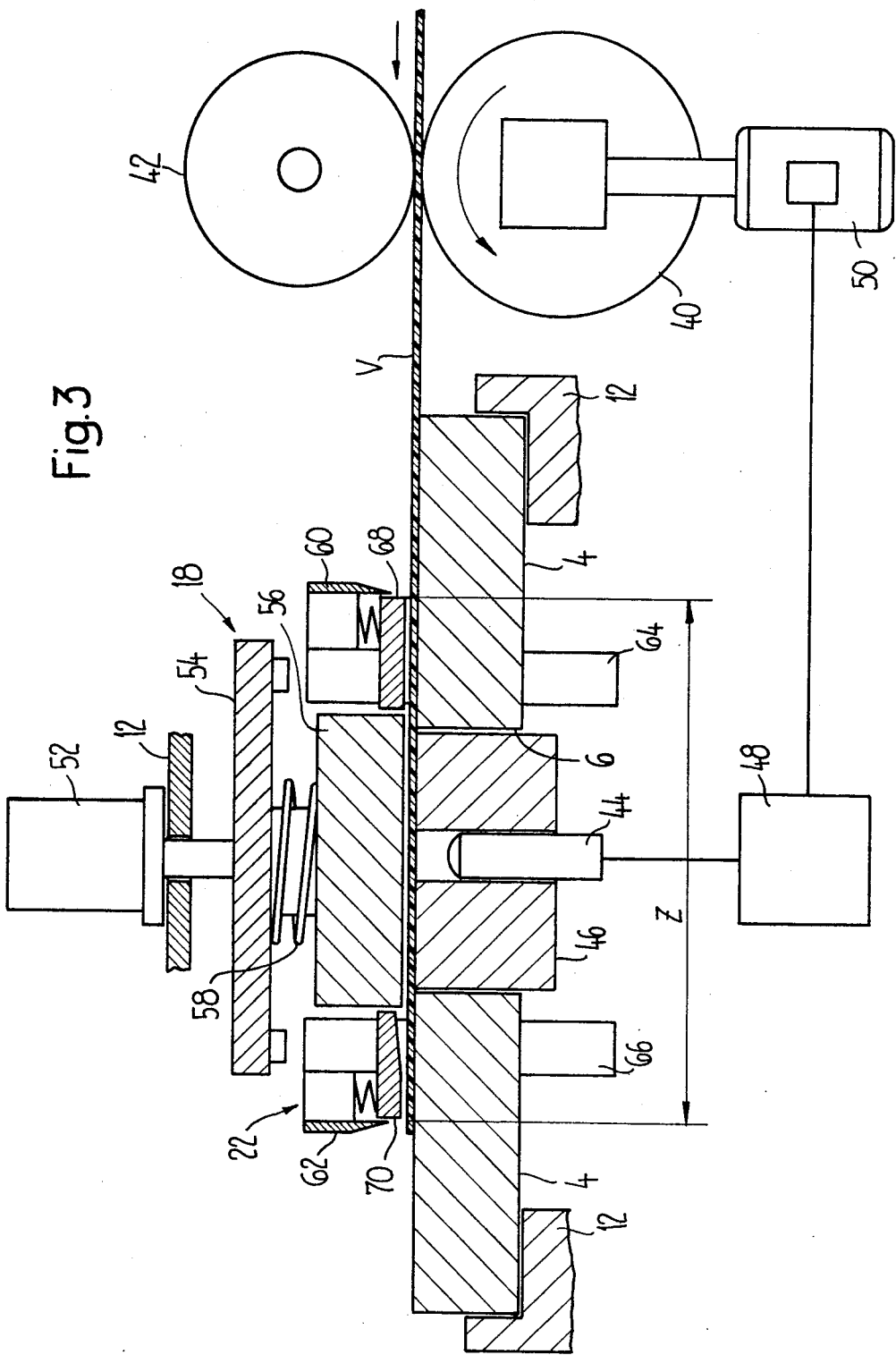
FIG. 3 shows a cut along line III—III in FIG. 1.

At the loading station 18, shown in FIG. 3, web shaped composite material V, which had been pulled off a supply roll, not shown, by means of feed rollers 40, 42, is fed to the carriage 2 in cross direction (FIG. 1). The feed in this case, takes place depending on the position of the carriage 2, onto one of the two receiving tables 20 or 22. In case of the position of the carriage shown in FIGS. 1 and 3, the composite material is fed to receiving table 22.

The feed of the composite material V is controlled by a photocell 44, embedded in a locally fixed loading table 46. The photocell here scans the printed side of the composite material facing the loading table 46, for the appearance of a mark, as above mentioned in the repetitively printed picture on the composite material V, in order to stop a driving motor 50 by way of a control arrangement 48 connected with said mark. Thus the drive of the feed roll 40 is interrupted. The photocell 44 and the mark of the printed picture on the composite material are synchronized such that a length of composite material, more than enough for the forming of a blank Z, or of its unrolled length (FIG. 3) is located on the receiving table 22 at the time of stopping of the feed. As a result of the disposition of the mark, about in the middle of the blank, and thus about in the middle of unwinding, forming the hollow body to be produced, guarantee will be given, that mistakes resulting from distortions of the composite material during its finishing and after printing will have no effect on the position of the printed picture in the peripheral direction of the hollow body, so that even a covering up of this printed picture as a result of the overlapping brought about during the deformation or even a cutting of the printed picture during "cutting-to-length" of the blanks may be excluded.

Whenever, the feed rollers 40, 42 are stopped, an operating cylinder 52 is triggered by a follow-up control, not shown, which presses down a press pad 56 via an operating plate 54 and springs 58 and at the same time clamps down the composite material on the loading table 46. Immediately after that, a separating knife 60 and a "cutting-to-length" knife 62 are guided against the composite material V, and a blank Z is separated from it by the operating plate 54, the dimension of which, limited by the distance between the knifes 60, 62, corresponds to the unwinding length, i.e., the unwinding of the finished hollow body plus an additional width of at most a few millimeters for the formation of an overlap seam. The knives 60, 62 are disposed vertically shiftably in guide bolts 64, 66 disposed in the halves 4 of the table, whereby the guide bolts 64, 66 on their part are shiftable vertically between two end positions in the table halves 4. In the upper end position of the guide bolts 64, 66, shown in FIG. 3, clamping jaws 68, 70 leave open an insertion gap for the composite material between themselves and the table halves. In case of the downward movement of the operating plate 54, however, not only the knives 60, 62 but the clamping jaws 68, 70 too, are pressed onto the composite material, so that the latter is clamped down on the table halves 4 in the area of the blank that is to be formed. The bolts 64 and 66 always cooperate with a stop arrangement (not shown) in the table halves 4 or 6, whereby the stop arrangements firmly hold the guide bolts in one end position once assumed, until a shift takes place under the effect of an operating element into the opposite end position.

The seizure of the composite material V forming the blank, first between press pad 56 and loading table 46, as well as the temporally delayed seizure by the clamping jaws 68, 70 causes the composite material, forming the blank, to be held fast in a completely spread-out state on the receiving table 22. The clamping effect of the clamping jaws 68, 70 is maintained, even if the operating plate 54 has been shifted into the lifted position by the operating cylinder 52, in which position the press pad 56 has also released the blank Z and has returned into the position shown in FIG. 3.

The blank Z is fed from the loading station 18 in firmly stretched position by the clamping jaws 68 and 70 on the receiving table 22, upon operation of the shifting cylinder 32 and a corresponding shift of the carriage 2 into the end-position of FIG. 1 shown in dash-dot lines, of the forming station 16. As soon as the carriage 2 has reached its corresponding end position, the driving motor 50 is started, so that the feed rollers 40, 42 will pull more web shaped composite material from the supply roller and may then deliver it to the receiving table 20 which in meantime has arrived at the loading station 18. At the same time the previously described process is repeated. The blank Z, clamped down on the receiving table 20 is moved in a succeeding movement of the carriage 2 to its left, to the FIG. 1 solid line terminal position of the forming station 14.

Figure 4:
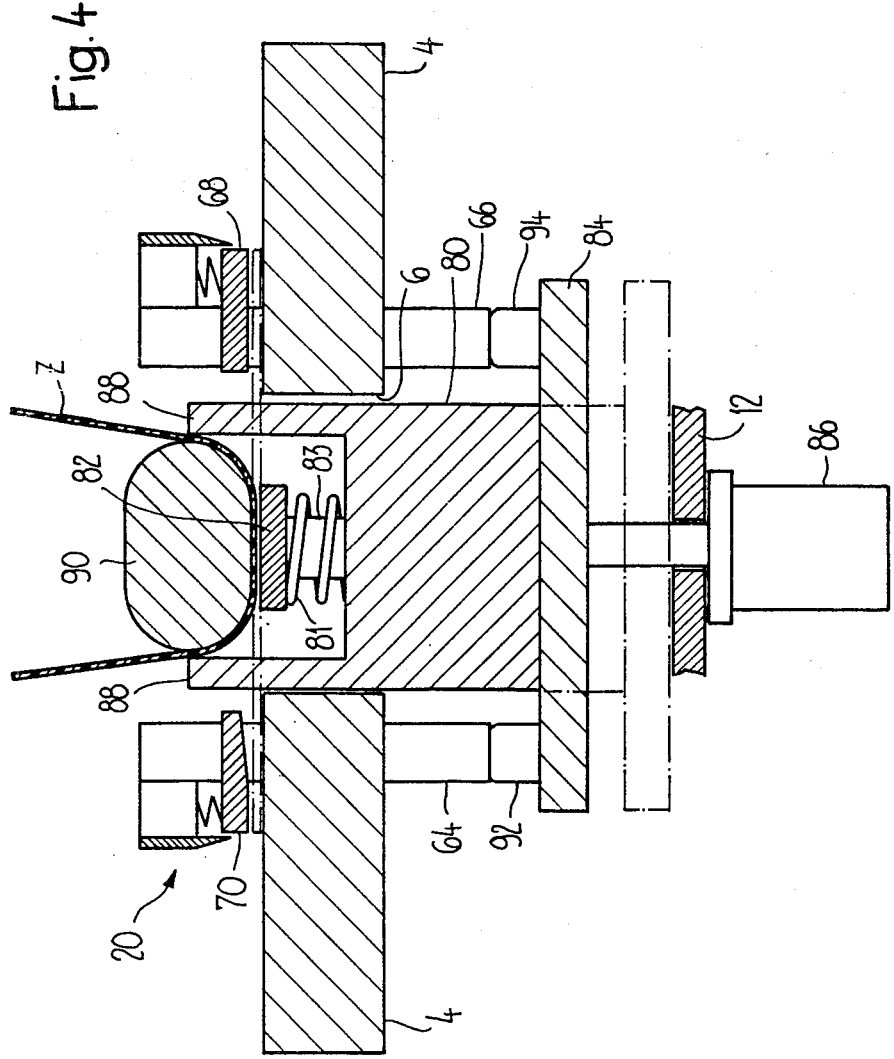
FIG. 4 shows a cross section through one of the forming stations.
Figure 5:
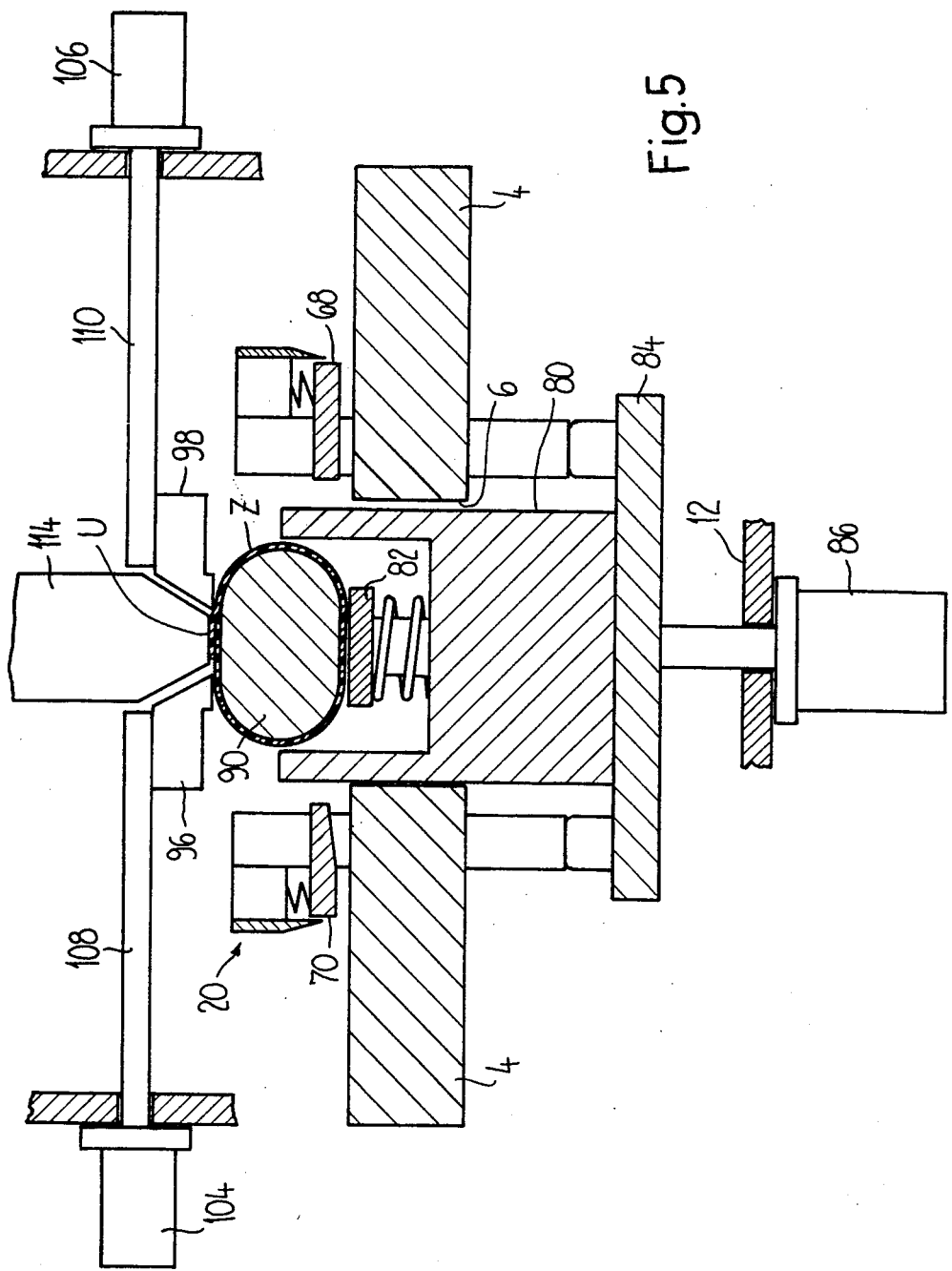
FIG. 5 shows a cut corresponding to FIG. 4 with a different position of the parts.

Subsequently the development and method of operation of the two forming stations 14 and 16 will be described, mainly in connection with FIGS. 3 and 4. As becomes clear from these figures, the forming station 14 has a bipartite molding tool 80, 82, which rests on an operating plate 84 and is disposed in the interval 6 between the two halves 4 of the carriage. The operating plate 84 is under the effect of a lifting cylinder 86, attached to the machine frame 12, and is shown in FIGS. 4 and 5 lifted out of its rest position shown in dash-dot lines. During lifting of the operating plate 84, the clamping strip 82 comes into contact with the blank Z in a first operating step and presses it against the underside of an ovally flattened mandrel 90 which runs in the longitudinal direction of the carriage 2 and which is attached in a cantilevered manner at its end facing the loading station 18 by way of a support 92 (FIG. 2) on the machine frame 12. In a homologously corresponding manner, a mandrel 100, which is assigned to the loading station 16, is attached to the machine frame 12 by way of a support 102.

Since the clamping rail 82 is supported via compression springs 81 and guide bolts 83 on the forming tool 80 or is guided in it perpendicularly shiftably, said forming tool 80 after clamping of section Z on the mandrel 90 may be moved farther upwards by clamping rail 82, so that its upwardly U-shaped pair of forming jaws 88 seize the blank Z in the still layed-out position shown in a dash-dot line in FIG. 4, and bend it upwards at both flanks of the middle part, clamped by the clamping rail 82. For this, the outside parts of the blank Z, which had been held until then by the clamping jaws 68 and 70 on the carriage 2, have been released, and to be sure as a result of lugs 92 and 94, attached to the operating plate 84, which cooperate with the guide bolts 64 and 66 of the receiving table 20. Correspondingly, the guide bolts 64, 66 with the clamping jaws 68, 70 attached thereto were shifted into the upper end position. Whenever the blank Z has reached the about U-shape shown in FIG. 4, then additional forming jaws 96 and 98 (FIG. 1) become effective on the freely projecting legs or outside areas, which are mutually, horizontally movable by operating cylinders 104 and 106 via piston rods 108 and 110. At the same time the control means of the operating cylinders 104, 106 are designed such, that the forming jaw 96 bends the associated adjacent leg of the blank onto the mandrel 90, before even the other leg, adjacent to forming jaw 98, is completely wrapped around the mandrel 90. Thus an overlapping O develops of the two longitudinal edges of the blank Z, which is shown in FIG. 5 (at an exaggerated width, for clarity of illustration).

As soon as the overlap has developed a welding-cooling jaw 114 is pressed on the overlap by means of a lifting cylinder 112 disposed above the mandrel 90. The welding-cooling jaw 114 is equipped, in a manner not shown, with a coil of a high frequency welding device, which produces the necessary heat for welding in the metallic layer contained in the blank Z, for the production of a seam in the area of the overlapping U. The welding, cooling jaw 114 may be equipped with cooling tubes through which water flows, in order to accelerate the heat dissipation from the overlap U.

Whenever the welded seam in the overlap U has cooled down sufficiently, then the welding-cooling jaw 114, which kept excerting a pressure on the overlapping during the entire connecting process, may be lifted off and returned in to the starting position. The forming jaws 96 and 98 are withdrawn in the same way and the operating plate 84 with the tool 80, 82 is lowered by the lifting cylinder 86. Now the carriage 2 is shifted by the lifting cylinder 32 to its right-most terminal position, whereby the welded blank Z, formed into a hollow body, remains on the mandrel 90.

During this movement of the carriage, a new blank Z which had in meantime been prepared and clamped down on the receiving table 22 has been transferred to the forming station 16. Simultaneously a hollow body H formed in a previous operating process is now stripped from the mandrel 100 of the forming station 16 by the unloading tool 26 of the right hand end of the carriage. For this purpose, the unloading tool 26 has two retractible stripping jaws 122, which can be fed in horizontally by two compressed air cylinders 120. The jaws engage with diametrically opposite sides of the hollow body H on the mandrel by friction contact and drive said hollow body during the movement of the carriage. The stripped-off hollow body H may be delivered in the right-most terminal position of the carriage 2 to a collecting container, not shown, or to a conveying element, not shown.

The hollow body H, held in FIG. 1 by the unloading tool 24, has been released by withdrawal of the stripping jaws 122, into the right hand terminal position, prior to the movement of the carriage 2. During the subsequent movement of the carriage 2, the unloading tool 24 reaches the forming station 14, where the mandrel 90 now likewise carries a finished hollow body.

Resulting from what has been described, not only the unloading tools 24 and 26 are identical with regard to their development, but this is true also for receiving tables 20 and 22. Finally, the forming stations 14 and 16 are also completely identical, except for the homologous attachment of the mandrels 90 or 100.

The embodiment shown in FIGS. 6 and 7, provides a modification of the receiving tables and of the machine frame. Therefore, parts of the apparatus which correspond with the embodiment of FIGS. 1-5, have the identical reference numbers. Differently from the embodiment explained before, in the embodiment of FIGS. 6 and 7, a stationary "cutting-to-length" knife 150 is assigned to each of the two receiving tables (only the receiving table 22' has been shown), which is provided on the path of this table between the loading station 18 and the forming station 14 not shown. The second "cutting-to-length" knife, which is assigned to the receiving table 22, has been disposed correspondingly on the path between the loading station 18 and the forming station 16.

The "cutting-to-length" knife 150 is attached by means of a carrier 152 rigidly to the machine frame 12, and has a perpendicularly running cutting edge, or one 154 slightly inclined with respect to the vertical. In any case, the cutting edge 154 runs almost perpendicularly in relation to the plane of the receiving table 22' or of the raw-blank Z', held on the former (FIG. 7). During passage of the receiving table or of the raw blank, the latter is shortened correspondingly to the measure of the length of unwinding of the blank by the cutting edge 154, pointed opposite to the direction of movement. It is of essential importance that the cutting process is carried out by means of knife 150 in any case at that edge of the blank, which fits against the inside of the overlap in the hollow body. In case of this cutting edge, a perfect cut is quite essential, whenever the quality requirements for packing tubes having sensitive filler material, such as for example, toothpaste are to be met, a complete or reliable overflowing of the cutting edge can only be assured, as is the case with the arrangement of knives shown, whenever a clean cut is produced over the entire cross section of the composite material, i.e., even through its metal layer.

The apparatus shown in the emdobiments enables one to produce conical instead of cylindrical hollow bodies also with basically the same tools. In that case it is particularly advantageous that, as a result of the arrangement by pairs especially of the receiving tables, the blanks may be made from a web-like supply of composite material without increased loss of material as compared to the production of cylindrical bodies. In this case, a corresponding, mutually equal arrangement of the knives of each receiving table at an angle in relation to the longitudinal axis of the carriage is needed, whereby the arrangement of the knives for both receiving tables is homologously the same. Correspondingly, in case of the previously described method of operation with alternating delivery to the two receiving tables of composite material from the same supply web no chips develop.

Naturally, additional knives may also be assigned to the receiving tables for the production of curved edges at the front sides of the blanks, in so far as this is needed.

It should now be apparent that the process and apparatus for the production of a pipe-shaped hollow body, especially of container tubes from a multilayer composite sheet material, as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. Apparatus for producing a tubular body from a blank of sheet material of which the opposite faces, at at least adjacent respective opposite lateral margins of each face are made of mutually weldable thermoplastic material, the blank having a central section, and two opposite flanks which respectively have said opposite lateral margins distally of the central section, said apparatus comprising:

a fixed mandrel;

a loading station including means for advancing a web of said sheet material and severing means for separating from said web a succession of such blanks; a receiving table which is shiftable longitudinally of the mandrel between a more remote position and an adjacent position; clamping means associated with the receiving table; said loading station serving said receiving table at said remote position for advancing onto the latter a leading end section of the web;

said clamping means including means for clamping said leading end section of the web on said receiving table prior to the separating of a blank from the web corresponding to said leading end section for situationally predetermining by the severing means where the lateral margins of the separated blank will be relative to the receiving table;

said receiving table further including means to maintain the separated blank clamped by said clamping means with the lateral margins located as situationally predetermined during the longitudinal shifting of said receiving table to said adjacent position thereof;

means for urging while clamped by said clamping means a situationally predetermined medial portion of the blank, which is included in said central section, against a situationally predetermined corresponding site upon the mandrel for situationally predetermining where the lateral margins of the blank will be relative to a welding means when the blank is convolutely conformed to the mandrel; means for releasing the blank from the clamping means after being urged against said corresponding site;

means for conforming the so-aligned blank, convolute fashion, about the mandrel from the central section toward both opposite lateral margins thereof, until both opposite lateral margins are overlapped upon the mandrel, this conforming means including a set of forming jaws, movable laterally toward and away from the mandrel; and means facing the mandrel for welding the overlapped lateral opposite margins of the blank to one another.

2. The apparatus of claim 1, wherein:

the receiving table has associated therewith first knife means for severing a blank from the leading end of the web at said loading station and thus provisioning the receiving table with that blank;

said web of sheet material having a width corresponding at least to the length of said tubular body, and being provided on those portions which are to become a succession of such blanks with what will become a trailing lateral margin of each leading one such blank integrally joined by a selvage band to what will become the leading lateral margin of the respective next such blank in said succession, so that when said first knife means are operated once, a first cut is made transversally of said web to separate a raw blank from the leading end of the web; said raw blank having a said selvage strip remaining integrally joined along one said lateral margin of said blank; and each receiving table having associated therewith second knife means for severing said selvage strip from the respective raw blank to provide the respective blank.

3. The apparatus of claim 1, wherein:

said mandrel, at least where said lateral margins of said blank are overlapped thereon, that being where said welding means faces said mandrel, said mandrel exteriorly is more flat than being circular cylindrically curved; and wherein said welding means is constituted by a welding-cooling jaw movable transversally toward and away from the mandrel.

4. Apparatus for producing a tubular body from a blank of sheet material of which the opposite faces, at least adjacent respective opposite lateral margins of each face are made of mutually weldable thermoplastic material, the blank having a central section, and two opposite flanks which respectively have said opposite lateral margins distally of the central section, said apparatus comprising:

a fixed mandrel;

means for feeding a blank of composite material to the mandrel, said feeding means including: a receiving table which is shiftable longitudinally of the mandrel between a more remote position for loading and an adjacent position for delivery of the blank to a conforming means;

means for conforming the so-aligned blank, convolute fashion, about the mandrel from the central section toward both opposite lateral margins thereof, until both opposite lateral margins are overlapped upon the mandrel, this conforming means including a set of forming jaws, moveable laterally toward and away from the mandrel;

means facing the mandrel for welding the overlapped lateral opposite margins of the blank to one another;

a loading station having said blank feeding means;

a second mandrel;

a second conforming means, like the first-described conforming means, but for said second mandrel;

second welding means facing the second mandrel;

a carriage, longitudinally movable between two positions;

said receiving table being provided on said carriage, and a second, like receiving table being provided on said carriage at a site longitudinally spaced therealong from the first-described receiving table, with such spacing that when the carriage is in the first of said two positions, one of these two receiving tables is laterally beside the loading station and the other of these two receiving tables is laterally beside the respective mandrel, conforming means and welding means;

there being a set of mandrel unloading tools provided for and associated with each of said mandrels.

5. The apparatus of claim 4, wherein:

the two sets of mandrel unloading tools are provided on the carriage, longitudinally before and after the respective receiving tables, with such spacing that when one receiving table is beside the loading station, the set of mandrel unloading tools associated with the mandrel served by said one receiving table is beside that mandrel.

6. The apparatus of claim 5, wherein:

each set of unloading tools includes movable stripping jaws for cooperation with the respective mandrel to grasp and longitudinally pull therefrom the resulting tubular body formed from a said blank thereon.

7. The apparatus of claim 4, wherein:

said loading station includes:

means for longitudinally advancing a web of said sheet material and means for severing from the leading end thereof a succession of such blanks; and each receiving table has associated therewith first knife means for severing a blank from the leading end of said web at said loading station and thus for provisioning that receiving table with that blank.

8. The apparatus of claim 7, wherein:

said web of sheet material having a width corresponding at least to the length of said tubular body, and being provided on those portions which are to become a succession of such blanks with that will become a trailing lateral margin of each leading one such blank integrally joined by a selvage band to what will become the leading lateral margin of the respective next such blank in said succession, so that when said first knife means are operated once, a first cut is made transversally of said web to separate a raw blank from the leading end of the web; said raw blank having a said selvage strip remaining integrally joined along one said lateral margin of said blank; and each receiving table having associated therewith second knife means for severing said selvage strip from the respective raw blank to provide the respective blank.

9. The apparatus of claim 8, further including:

means for adjusting each second knife means for removing greater or lesser breadth of raw blank as selvage strip, said second knife means being inclined from perpendicularly with the plane of said raw blank when spread upon the respective receiving table.

* * * * *